US009302448B2

(12) United States Patent
Dubey et al.

(10) Patent No.: US 9,302,448 B2
(45) Date of Patent: Apr. 5, 2016

(54) FLEXIBLE CEMENTITIOUS MEMBRANE COMPOSITE AND ASSOCIATED CRACK-ISOLATION FLOOR SYSTEMS

(75) Inventors: Ashish Dubey, Grayslake, IL (US); Peter B. Groza, Round Lake Beach, IL (US)

(73) Assignee: United States Gypsum Company, Chicago, IL (US)

( * ) Notice: Subject to any disclaimer, the term of this patent is extended or adjusted under 35 U.S.C. 154(b) by 1659 days.

(21) Appl. No.: 11/508,356

(22) Filed: Aug. 23, 2006

(65) Prior Publication Data

US 2008/0060299 A1    Mar. 13, 2008

(51) Int. Cl.
| | |
|---|---|
| *E04F 15/22* | (2006.01) |
| *B32B 13/14* | (2006.01) |
| *C04B 28/02* | (2006.01) |
| *C04B 28/14* | (2006.01) |
| *B32B 5/02* | (2006.01) |
| *B32B 5/26* | (2006.01) |
| *B32B 7/06* | (2006.01) |
| *B32B 13/02* | (2006.01) |
| *B32B 29/02* | (2006.01) |
| *C04B 111/00* | (2006.01) |
| *C04B 111/60* | (2006.01) |

(52) U.S. Cl.
CPC ............... *B32B 13/14* (2013.01); *B32B 5/022* (2013.01); *B32B 5/024* (2013.01); *B32B 5/028* (2013.01); *B32B 5/26* (2013.01); *B32B 7/06* (2013.01); *B32B 13/02* (2013.01); *B32B 29/02* (2013.01); *C04B 28/021* (2013.01); *C04B 28/14* (2013.01); *B32B 2262/0223* (2013.01); *B32B 2262/0253* (2013.01); *B32B 2262/0269* (2013.01); *B32B 2262/0276* (2013.01); *B32B 2262/101* (2013.01); *B32B 2262/103* (2013.01); *B32B 2264/101* (2013.01); *B32B 2264/102* (2013.01); *B32B 2307/50* (2013.01); *B32B 2307/54* (2013.01); *B32B 2307/546* (2013.01); *B32B 2307/714* (2013.01); *B32B 2307/718* (2013.01); *B32B 2307/724* (2013.01); *B32B 2307/7265* (2013.01); *B32B 2307/734* (2013.01); *B32B 2419/00* (2013.01); *B32B 2471/00* (2013.01); *C04B 2111/00612* (2013.01); *C04B 2111/60* (2013.01); *Y02W 30/92* (2015.05)

(58) Field of Classification Search
CPC ........ B32B 13/14; B32B 13/02; B32B 5/024; B32B 5/022; B32B 5/028; B32B 29/02; B32B 7/06; B32B 5/26; B32B 2471/00; B32B 2307/724; B32B 2262/0223; B32B 2262/0253; B32B 2307/734; B32B 2262/0269; B32B 2264/102; B32B 2307/546
See application file for complete search history.

(56) References Cited

U.S. PATENT DOCUMENTS

| | | | | |
|---|---|---|---|---|
| 3,788,941 | A | * | 1/1974 | Kuptis ................ E04F 15/16 156/247 |
| 4,229,329 | A | | 10/1980 | Bennett |
| 4,278,720 | A | | 7/1981 | Shannon |
| 4,374,670 | A | * | 2/1983 | Slocombe .................. 522/33 |
| 4,441,944 | A | | 4/1984 | Massey |
| 4,494,990 | A | | 1/1985 | Harris |
| 4,588,443 | A | | 5/1986 | Bache |
| 4,590,731 | A | | 5/1986 | DeGooyer |
| 4,714,722 | A | | 12/1987 | Najvar et al. |
| 4,725,632 | A | | 2/1988 | Vess |
| 4,745,032 | A | | 5/1988 | Morrison |
| 4,797,318 | A | | 1/1989 | Brooker et al. |
| 5,052,161 | A | | 10/1991 | Whitacre |
| 5,192,366 | A | | 3/1993 | Nishioka et al. |
| 5,255,482 | A | | 10/1993 | Whitacre |
| 5,308,397 | A | | 5/1994 | Whatcott |
| 5,310,278 | A | * | 5/1994 | Kaczmarczik et al. ......... 404/14 |
| 5,346,550 | A | | 9/1994 | Kunzi et al. |
| 5,439,518 | A | * | 8/1995 | Francis et al. ............ 106/705 |
| 5,542,534 | A | | 8/1996 | Dinter et al. |
| 5,549,859 | A | | 8/1996 | Andersen et al. |
| 5,578,363 | A | * | 11/1996 | Finley et al. .............. 428/194 |
| 5,603,758 | A | | 2/1997 | Schreifels, Jr. et al. |
| 5,709,913 | A | | 1/1998 | Andersen et al. |
| 5,725,652 | A | | 3/1998 | Shulman |

(Continued)

FOREIGN PATENT DOCUMENTS

| | | |
|---|---|---|
| FR | 2 517 728 | 6/1983 |
| FR | 2 681 884 | 4/1993 |

(Continued)

OTHER PUBLICATIONS

Mapei ECO 350 Product Sheet, Retrieved on Oct. 6, 2010.*

(Continued)

*Primary Examiner* — Cheng Huang

(74) *Attorney, Agent, or Firm* — Greer, Burns & Crain, Ltd.; Pradip Sahu; Philip T. Petti

(57) ABSTRACT

In a preferred embodiment, a floor crack isolation system includes a membrane and a deformable adhesive. The membrane includes a basemat, having at least three plies, a ply of a meltblown polymer sandwiched between two plies of spunbond polymer; and a flexible coating applied to the basemat, the coating having a cementitious hydraulic component, a polymer comprising a water-soluble, film-forming polymer; and water. The finished membrane is flexible and is bonded to a subfloor with a deformable adhesive. A method of making the floor crack isolation system includes obtaining a coated, three-ply, flexible membrane and applying it to a subfloor with a deformable adhesive.

10 Claims, No Drawings

(56) References Cited

U.S. PATENT DOCUMENTS

| | | | |
|---|---|---|---|
| 5,810,961 A | 9/1998 | Andersen et al. | |
| 5,850,716 A * | 12/1998 | Thompson et al. | 52/177 |
| 5,867,957 A * | 2/1999 | Holtrop | 52/403.1 |
| 5,956,921 A | 9/1999 | Fleck et al. | |
| 5,965,257 A | 10/1999 | Ahluwalia | |
| 6,121,166 A * | 9/2000 | Wood et al. | 442/151 |
| 6,161,353 A | 12/2000 | Negola et al. | |
| 6,167,668 B1 | 1/2001 | Fine et al. | |
| 6,171,388 B1 | 1/2001 | Jobbins | |
| 6,455,615 B2 | 9/2002 | Yu et al. | |
| 6,500,560 B1 * | 12/2002 | Kiik et al. | 428/489 |
| 6,537,366 B1 | 3/2003 | Supplee, Sr. | |
| 6,569,923 B1 | 5/2003 | Slagler | |
| 6,586,080 B1 | 7/2003 | Heifetz | |
| 6,586,353 B1 | 7/2003 | Kiik et al. | |
| 6,632,527 B1 | 10/2003 | McDaniel et al. | |
| 6,898,917 B2 | 5/2005 | Durning et al. | |
| 7,056,583 B2 | 6/2006 | Stewart | |
| 2002/0074735 A1 * | 6/2002 | Gasper | F02M 57/02 277/558 |
| 2002/0081410 A1 * | 6/2002 | Buckwalter et al. | 428/40.1 |
| 2003/0004246 A1 | 1/2003 | Wache et al. | |
| 2003/0203145 A1 | 10/2003 | Zanchetta | |
| 2003/0207634 A1 | 11/2003 | Holeschovsky | |
| 2004/0077247 A1 * | 4/2004 | Schmidt et al. | 442/382 |
| 2004/0204516 A1 | 10/2004 | DeFord et al. | |
| 2005/0164580 A1 | 7/2005 | Holeschovsky | |
| 2006/0054059 A1 * | 3/2006 | Dubey et al. | 106/698 |
| 2010/0213093 A1 * | 8/2010 | Iwasaki | B65D 73/0028 206/466 |

FOREIGN PATENT DOCUMENTS

| | | |
|---|---|---|
| WO | WO 96/24561 A | 8/1996 |
| WO | WO 2005/010294 | 2/2005 |

OTHER PUBLICATIONS

University of California, Berkeley; 2003 Bearkelium; Concrete Canoe Design Report; University of Alabama in Huntsville; 2000 Concrete Canoe Design Report; "Ingenuity"; Designing reinforced concrete from a new perspective.

The Sydney Morning Herald; May 28, 1987; It Flies . . . Here'S Concrete Evidence; Clemson University Concrete Canoe Team "Instinct".

* cited by examiner

FLEXIBLE CEMENTITIOUS MEMBRANE COMPOSITE AND ASSOCIATED CRACK-ISOLATION FLOOR SYSTEMS

BACKGROUND

This invention relates to underlayment systems that reduce crack propagation from a subfloor to a finished floor. In one embodiment, a membrane that includes a thin hydraulic layer on a basemat is used with a deformable adhesive as an underlayment for laying ceramic tile. Other embodiments are directed to a floor system with reduced cracking and a method of making it.

Ceramic tiles and natural stones are both beautiful and practical as surface coverings on floors and walls. They may be waterproof, easily cleaned, durable and can be decorated with an infinite variety of colors and designs. Recently they have become quite popular for use in bathrooms, kitchens and foyers where water is frequently present.

House construction commonly calls for wood to be used as subfloors and drywall to be installed on walls. If wood or drywall is repeatedly exposed to water, it swells as it soaks up water, then contracts as the water evaporates. Repeated cycles of expansion and contraction breaks down the cell walls, causing the substrate to soften, decay and disintegrate over time. When wet, these substrates may also be susceptible to attack by molds, causing additional damage.

If finish surface materials such as ceramic tiles and natural stones are applied directly to wood or drywall, cycles of swelling and drying, and the resultant damage, cause problems with cracking and breaking of the finish surface. Ceramic tiles and natural stones are very rigid and brittle materials, and do not give or stretch when the substrate deflects or moves. When the substrate deflects or moves, the attached tile moves with it causing the tile to crack or break when adjacent areas of substrate move at different rates. If a cracked or broken tile is not replaced immediately, water will be able to seep through the crack, causing even more swelling and drying of the substrate, often resulting further damage to the ceramic tiles.

Typically, 5/16 inch or 1/2 inch (6 mm or 13 mm) cement board, such as DUROCK® brand cement board manufactured by United States Gypsum Company, Chicago, Ill., is used as a sub-floor underlayment under ceramic tile to provide a compatible surface for bonding to the adhesive tile and to provide an underlayment that does not move laterally. If exposed to water, cement does not swell or degrade and it adds strength and stability under the tiles.

However, the use of cement board has certain disadvantages. A half inch thick cement board weighs about 3 pounds per square foot (13.1 kg/m$^2$), and can cause fatigue in those who move it to or around the job site or while placing it in position to receive the ceramic tile. Fastening of the cement board to the subfloor requires a large number of fasteners and adds extra labor to the cost of the job. Frequently, the board is cut to fit the underlayment at the edges or to go around corners or cabinets. During and after cutting, alkaline fibers in the dust and exposed edges can be irritating to skin or lungs. Cement board is not waterproof and allows transmission of liquids through it. Thus, attempts have been made in the prior art to find an underlayment that has a good adhesive surface, does not move, yet is lighter in weight and less irritating than cement board.

Plastic sheeting has been used as an underlayment for ceramic tiles. It is thin, lightweight and provides a waterproof barrier. However, plastic has a poor surface for bonding to the mortar used to adhere the tiles.

Thin layers of a lightweight, waterproof concrete composition were used to make concrete canoes by engineering students at several universities for a contest in 2003. The University of Alabama at Huntsville team used a mixture of Portland cement, a latex, an acrylic fortifier, plastic microspheres and water. This mixture produced a composition that had good workability and water resistance. It had a weight of only 14.7 pounds per cubic foot (199 kg/m$^3$).

U.S. Pat. No. 6,455,615 to Yu discloses a flexible polymer modified cement that can be used alone or on a substrate. It is disclosed for use in concealed areas of construction engineering, water conservancy projects and municipal works. A hydraulic cement, a polymer dispersion and water are calendared to form sheets, then dried until the composition is firm. The hydraulic material optionally includes from 20% to about 50% other hydraulic materials, including fly ash, silica fume, metakaolin and slag.

Even where a flexible sheeting, such as plastic sheeting, is used as an underlayment, it is not effective for reducing damage to the surface finish where the structural subfloor or the subfloor underlayment (hereinafter, collectively the "subfloor") becomes cracked or broken. Typically, traditional floor systems use rigid construction with respect to the bond between the floor finish surfacing material and the substrate. In such systems, the tiles are bonded directly to the substrate using a thin set mortar. If cracks develop in the subfloor, the developed cracks eventually propagate upward through the thin set mortar and the finishing floor surface.

Movement or breaks in the subfloor cause delamination of the underlayment because the underlayment is pulled away from the subfloor at or near the site of the break. Thus, there is a need in the art for a floor underlayment system that allows the membrane to remain attached to the subfloor, even when the subfloor becomes cracked or damaged. Further, there is a need for a floor underlayment system that reduces propagation of cracks in the structural sub-floor or sub-floor overlay from propagating to the floor finish surface.

SUMMARY

These and other needs are addressed by an improved underlayment system that includes a membrane for use as an underlayment for ceramic tile and an adhesive for attaching the membrane to the structural subfloor or the subfloor overlay. The membrane is flexible and includes a basemat to which a flexible coating is applied. The adhesive is deformable.

In a preferred embodiment, an underlayment system includes a flexible membrane having a basemat that includes at least three plies, a center ply of a meltblown polymer sandwiched between two plies of spunbond polymer; and a flexible coating applied to the basemat, the coating having a hydraulic component, a polymer comprising a water-soluble, film-forming polymer; and water. Use of this specific basemat to make a coated membrane results in a product that is waterproof, soft to the touch, strong and extremely flexible even though coated with a hydraulic cementitious slurry. The spunbond layers hold the slurry, which binds the fibers in those layers into a crystalline matrix as the hydraulic material hydrates. The membrane is attached to the subfloor using a deformable adhesive.

In another embodiment of the floor underlayment system, the membrane includes a flexible basemat to which is applied a coating. The coating includes a polymer and a hydraulic material comprising at least 50% fly ash.

Yet another embodiment is to a flooring system that includes the subfloor, the flexible membrane, the deformable adhesive and a finish floor component. A method of making a crack isolation system includes obtaining a flexible membrane comprising a basemat and a coating on at least one surface of the basemat, providing a deformable adhesive; and applying the deformable adhesive between a subfloor and the membrane.

The waterproof membrane for use between a substrate and ceramic tiles is obtained that is extremely flexible and resilient. It has very good tolerance to damage, even after severe, repeated deformation cycles. The membrane has good moisture resistance and moisture durability. The slurry sets very rapidly, especially when dried in an oven or kiln. There is virtually no plastic shrinkage induced cracking as the product dries. Water demand for processing is very low, and the mixture is flowable and self-leveling even at low water addition rates.

When combined with a deformable adhesive, this membrane is part of a floor crack isolation system that reduces propagation of cracks in the subfloor from percolating upward to cause damage to the finish floor. When cracks occur, both the adhesive and the membrane stretch and deform, absorbing the lateral forces that attempt to move pieces of the finish floor or sections of the grout in the vicinity of the crack. Since less stress passes through to the visible portion of the flooring, it is less likely to crack or break. Such a floor system requires less maintenance than conventional flooring. It will have to be regrouted less frequently. It is less likely to require replacement of broken tiles or other flooring pieces.

DETAILED DESCRIPTION

Flexible hydraulic materials are made suitable for use, among other things, as underlayment for ceramic tiles. Unless otherwise noted, amounts or concentrations reported herein describing the compositions are on a weight basis, exclusive of any water that may be present.

In a first embodiment, a flexible membrane is coated with a cementitious coating that includes fly ash. Any hydraulic materials are useful in the coating composition of this invention. Class C hydraulic fly ash, which is a high lime content fly ash obtained from the processing of certain coals, or its equivalent, is the most preferred hydraulic material. ASTM designation C-618 describes the characteristics of Class C fly ash (Bayou Ash Inc., Big Cajun, II, La.). When mixed with water, the fly ash sets similarly to a cement or gypsum. Use of other hydraulic materials in combination with fly ash are contemplated, including cements, including high alumina cements, calcium sulfates, including calcium sulfate anhydrite, calcium sulfate hemihydrate or calcium sulfate dihydrate, lime, other hydraulic materials and combinations thereof. Mixtures of fly ashes are also contemplated for use. Silica fume (SKW Silicium Becancour, St. Laurent, Quebec, Calif.) is another preferred material.

While not wishing to be bound by theory, it is believed that the shape of the fly ash particle contributes to the Theological characteristics of this coating. The substantially spherical shape of fly ash creates a "ball bearing" effect in the mix, improving workability of the coating without increasing water requirements. In addition, some fly ashes have been shown to significantly decrease heat generation as the concrete hardens and strengthens. Fly ash, as do all pozzolanic materials, generally provides increased strength gain for much longer periods than mixes with Portland cement (St. Mary's Cement Inc., Detroit, Mich.) only.

Another reason fly ash is preferred in this coating is the increased life cycle expectancy and increase in durability associated with its use. During the hydration process, fly ash chemically reacts with the calcium hydroxide forming calcium silicate hydrate and calcium aluminate, which reduces the risk of leaching calcium hydroxide, making the composition less permeable. Fly ash also improves the permeability of hydraulic compositions by lowering the water-to-cement ratio, which reduces the volume of capillary pores remaining in the set composition. The spherical shape of fly ash improves the consolidation of the coating, which also reduces permeability. It is also theorized that tricalcium aluminate, which is, frequently present in fly ash, acts as a set accelerator to speed up the setting reactions.

In some embodiments of the invention, the hydraulic component includes at least 50% hydraulic fly ash by weight. Preferably, the hydraulic component includes at least 55% hydraulic fly ash. More preferably, the hydraulic component includes at least 60% hydraulic fly ash. More preferably, the hydraulic component includes at least 65% hydraulic fly ash. More preferably, the hydraulic component includes at least 70% hydraulic fly ash. More preferably, the hydraulic component includes at least 75% hydraulic fly ash. More preferably, the hydraulic component includes at least 80% hydraulic fly ash. More preferably, the hydraulic component includes at least 85% hydraulic fly ash. More preferably, the hydraulic component includes at least 90% hydraulic fly ash. More preferably, the hydraulic component includes at least 95% hydraulic fly ash. More preferably, the hydraulic component includes at least 99% or essentially all hydraulic fly ash. The remainder of the hydraulic component includes any hydraulic materials or mixtures thereof. In some preferred embodiments, the hydraulic component is essentially all hydraulic fly ash.

The total composition preferably includes from about 40% to about 92.5% by weight of the hydraulic component. More preferably, the hydraulic component makes up from about 45% to about 92.5% by weight of the composition. More preferably, the hydraulic component makes up from about 50% to about 92.5% by weight of the composition. More preferably, the hydraulic component makes up from about 55% to about 92.5% by weight of the composition. More preferably, the hydraulic component makes up from about 60% to about 92.5% by weight of the composition. More preferably, the hydraulic component makes up from about 65% to about 92.5% by weight of the composition. More preferably, the hydraulic component makes up from about 45% to about 85% by weight of the composition. More preferably, the hydraulic component makes up from about 50% to about 85% by weight of the composition. More preferably, the hydraulic component makes up from about 55% to about 85% by weight of the composition. More preferably, the hydraulic component makes up from about 60% to about 85% by weight of the composition. More preferably, the hydraulic component makes up from about 65% to about 85% by weight of the composition. More preferably, the hydraulic component makes up from about 40% to about 80% by weight of the composition. More preferably, the hydraulic component makes up from about 45% to about 80% by weight of the composition. More preferably, the hydraulic component makes up from about 50% to about 80% by weight of the composition. More preferably, the hydraulic component makes up from about 55% to about 80% by weight of the composition. More preferably, the hydraulic component makes up from about 60% to about 80% by weight of the composition. More preferably, the hydraulic component makes up from about 65% to about 80% by weight of the composition. More preferably, the hydraulic component makes up from about 40% to about 75% by weight of the composition. More preferably, the hydraulic component makes up from about 45% to about 75% by weight of the composition. More preferably, the hydraulic component makes up from about 50% to about 75% by weight of the composition. More preferably, the hydraulic component makes-up from about 55% to about 75% by weight of the composition. More preferably, the hydraulic component makes up from about 60% to about 75% by weight of the composition. More preferably, the hydraulic component makes up from about 65% to about 75% by weight of the composition.

The optional polymer is a water-soluble, film-forming polymer, preferably a latex polymer. The polymer can be used in either liquid form or as a redispersible powder. A particularly preferred latex polymer is a methyl methacrylate copolymer of acrylic acid and butyl acetate (Forton VF 774 Polymer, EPS Inc. Marengo, Ill.).

Although the polymer is added in any useful amount, it is preferably added in amounts of from about 5% to 35% on a dry solids basis. More preferably, the composition includes from about 10% to about 35% polymer. More preferably, the composition includes from about 15% to about 35% polymer. More preferably, the composition includes from about 20% to about 35% polymer. More preferably, the composition includes from about 5% to about 30% polymer. More preferably, the composition includes from about 10% to about 30% polymer. More preferably, the composition includes from about 15% to about 30% polymer. More preferably, the composition includes from about 20% to about 30% polymer. More preferably, the composition includes from about 5% to about 25% polymer. More preferably, the composition includes from about 10% to about 25% polymer. More preferably, the composition includes from about 10% to about 20% polymer. More preferably, the composition includes from about 15% to about 20% polymer. More preferably, the composition includes from about 5% to about 15% polymer. More preferably, the composition includes from about 10% to about 15% polymer.

In order to form two interlocking matrix structures, water must be present in this composition. The total water in the composition should be considered when adding water to the system. If the latex polymer is supplied in liquid form, water used to disperse the polymer should be included in the composition water. Any amount of water can be used that produces a flowable mixture. Preferably, about 5 to about 35% water by weight is used in the composition. More preferably, the amount of water ranges from about 10% to about 35% by weight. More preferably, the amount of water ranges from about 15% to about 35% by weight. More preferably, the amount of water ranges from about 20% to about 35% by weight. More preferably, the amount of water ranges from about 25% to about 35% by weight. More preferably, the amount of water ranges from about 30% to about 35% by weight. More preferably, the amount of water ranges from about 15% to about 30% by weight. More preferably, the amount of water ranges from about 10% to about 30% by weight. More preferably, the amount of water ranges from about 20% to about 30% by weight. More preferably, the amount of water ranges from about 25% to about 30% by weight. More preferably, the amount of water ranges from about 15% to about 25% by weight. More preferably, the amount of water ranges from about 10% to about 25% by weight. More preferably, the amount of water ranges from about 20% to about 25% by weight. More preferably, the amount of water ranges from about 15% to about 20% by weight. More preferably, the amount of water ranges from about 10% to about 20% by weight of water per 100 parts of dry hydraulic component.

The addition of water to the hydraulic material initiates hydration reactions. Water of hydration is absorbed from the slurry to form the crystalline matrix of the cementitious material. As the free water decreases, the polymer begins forming a film and hardens. Since both of these processes occur virtually simultaneously, the crystalline matrix of the cementitious material and the polymer film become intimately intertwined in each other, forming strong links between these two substances.

Any well-known additives for cements or polymer cements can be useful in any of the embodiments of the instant coating to modify it for a specific purpose of application. Fillers are added for a variety of reasons. The finished membrane can be made even more lightweight if lightweight fillers, such as expanded perlite, other expanded materials or either glass, ceramic or plastic microspheres, are added. Microspheres reduce the weight of the overall product by encapsulating gaseous materials into tiny bubbles that are incorporated into the composition thereby reducing its density. Foaming agents used in conventional amounts are also useful for reducing the product density.

Conventional inorganic fillers and aggregates are also useful to reduce cost and decrease shrinkage cracking as the coating dries. Typical fillers include sand, talc, mica, calcium carbonate, calcined clays, pumice, crushed or expanded perlite, volcanic ash, rice husk ash, diatomaceous earth, slag, metakaolin, and other pozzolanic materials. Amounts of these materials should not exceed the point where properties such as strength are adversely affected. When very thin membranes or underlayments are being prepared, the use of very small fillers, such as sand or microspheres are preferred.

Colorants are optionally added to change the color of the coating or finished articles. Fly ash is typically gray in color, with the Class C fly ash usually lighter than Class F fly ash. Any dyes or pigments that are comparable with the composition may be used. Titanium dioxide is optionally used as a whitener. A preferred colorant is Ajack Black from Solution Dispersions, Cynthiana, Ky.

Set control additives that either accelerate or retard the setting time of the hydraulic component are contemplates for use in these compositions. The exact additives will depend on the hydraulic materials being used and the degree to which the set time is being modified.

Reinforcing materials can be used to add strength to the composition. The additional of fibers or meshes optionally help hold the composition together. Steel fibers, plastic fibers, such as polypropylene and polyvinyl alcohols, and fiberglass are recommended, but the scope of reinforcing materials is not limited hereby.

Superplasticizer additives are known to improve the fluidity of a hydraulic slurry. They disperse the molecules in solution so that they move more easily relative to each other, thereby improving the flowability of the entire slurry. Polycarboxylates, sulfonated melamines and sulfonated naphthalenes are known as superplasticizers. Preferred superplasticizers include ADVA Cast by Grace Construction Products, Cambridge, Mass. and DILOFLO GW Superplasticizer of Geo Specialty Chemicals, Cedartown, Ga.

Shrinkage reducing agents help decrease plastic shrinkage cracking as the product dries. These generally function to modify the surface tension so that the slurry flows together as it dries. Glycols are preferred shrinkage reducing agents.

The hydraulic material, polymer, water and any optional components are combined in a mixer and mixed until a homogeneous blend is obtained. Preferably, the mixer is a high shear mixer providing a short residence time. For small batches of product, a typical laboratory blender is a suitable mixing device. For larger commercial operations, the use of commercially available continuous mixers manufactured by the PFT GMBH and Co. KG, based in Iphofen, Germany, are suitable. The preferred mixers have the capability of mixing as well as pumping the slurry in a continuous manner to the point of application. These mixers have a mixing chamber where all solid dry materials are blended together with the liquid additives including water using a cage agitator rotating at a high speed. In the normal mode of operation, the blended cementitious slurry continuously exits the mixing chamber and is pumped forward by a progressive cavity pump (rotor-stator type pump) to the point of application. The preferred PFT mixer models for this invention include PFT Mixing Pump G4, PFT Mixing Pump G5, PFT Monojet 2.13, PFT Mixing Pump T2E, PFT Mixing Pump MS1 and MS2.

After mixing, a flowable liquid exits from the mixer and can be poured into a mold or extruder, onto release paper or onto a basemat for shaping into an appropriate shape. Any method may be used to shape the composition, including coating, spreading, molding, extruding, calendaring, rolling, screeding, or any shaping method suitable for the article being produced. If a membrane for use as an underlayment for ceramic tile is being prepared, the composition is preferably rolled or screeded onto the basemat to form the membrane.

The composition is optionally formed on a basemat for strength and for ease in handling the finished sheets. Any suitable basemat material may be suitable for this application. Scrim, cloth, either woven or non-woven, fiber mesh, spunbond materials, and meltblown compositions are examples of workable basemats. Non-woven fibrous mats are made of polymeric materials, such as polypropylene, polyethylene, polyester or polyvinyl alcohol, or non-polymeric materials such as fiberglass.

Compared to non-woven materials, meshes and scrims are relatively larger strands or yarns that are oriented linearly. The yarns running in different directions may be spaced such that there are openings between the yarns, but use of mesh with no openings is also contemplated. The yarns may run in two or more directions and are suitably made of polymeric materials, including Kevlar, polypropylene, polyethylene, polyvinyl alcohol and polyesters inorganic materials, such as carbon and steel, natural fibers or a combination thereof. A preferred mesh material is a single layer of a polymer coated, glass, open weave mesh commonly known as fly screen mesh.

Although a single ply basemat is suitable, in some embodiments of this invention a multiple ply basemat is preferred. It is advantageous to combine different types of basemat materials to create a basemat that is optimized for particular uses. When used as an underlayment for ceramic tile, a three-ply composite basemat is particularly advantageous. The use of fibrous materials is preferred to control structure and porosity. At least three individual plies or laminas possess different structure and porosity and serve different functions in the finished product. The preferred basemat is composed of at least two different types of laminas. The first lamina type is highly porous, facilitating good slurry absorption. Non-woven fabrics from a spunbond process are preferred for the first lamina. The spunbond process is well known to artisans of fabric-making, and produces a high porosity lamina of long, continuous fibers that are virtually unending. The second lamina type is preferably highly impervious to water, resisting migration of liquids across it. This layer is preferably made using a meltblown manufacturing process, which is also well-known in the art. A meltblown lamina is composed of fibers that are short and fine, forming a network of fibers that is very dense and complex, making it difficult for liquids to pass through it.

A preferred basemat for this invention includes one meltblown lamina sandwiched between two spunbond laminae. The center meltblown lamina resists migration of liquids across the basemat, adding to the resistance to the flow of water or other liquids across the underlayment. The spunbond laminae are placed on either side of the meltblown lamina to provide high porosity. Porosity of the spunbond material allows for good infiltration and absorption of the cementitious slurry. The large fibers become incorporated into the crystal matrix of the cementitious material, forming a strong bond.

The laminae are bonded to each other by any suitable means. Three-ply composites are commercially available as an S-M-S laminate by Kimberly-Clark, Roswell, Ga. This product is made of polypropylene fibers. While providing a barrier to liquids, the material is still breathable, allowing water vapor to pass through it. Depending upon the end application and the performance requirements, other lamina may be more suitable for a particular application. U.S. Pat. No. 4,041,203, herein incorporated by reference, fully describes an S-M-S laminate and a method for making it.

In a commercial scale production line, the membrane is preferably made by a process beginning with unwinding the basemat from a spool and running it toward the mixing area. If the basemat is permeable by the slurry, an optional release paper is useful underneath the basemat to contain overspill of the slurry. With an impermeable basemat and proper design of the coating station, the need for the release paper can be eliminated. The basemat is aligned with and placed on a surface to be fed to coating equipment for application of the slurry.

The coating slurry is prepared by mixing the polymer and the hydraulic component in water. Preferably the mixing is done in a high shear mixer. Either a continuous or a batch mixer is useful, depending on the size of the batch being prepared.

The basemat is provided and the cementitious slurry is applied to it. Any coating apparatus is adaptable for use with the slurry, including rod coaters, curtain coaters, sprayers, spreaders, extrusion, pultrusion, roller coaters, knife coaters, bar coaters and the like to coat the basemat and form a sheet. One preferred method of spreading the slurry is by utilizing a screed bar. The screed bar can be metal, plastic, rubber or any material that scrapes excess coating from the basemat. A thin coating is obtained by keeping the screed bar in contact with the basemat. As a head of slurry builds up in front of the screed bar, the slurry spreads and uniformly covers the face of the basemat.

When spreading the slurry, it can be advantageous to position the screed bar over a flexible surface or no surface at all. Pressure is applied to the screed bar to build up a head and to obtain a thin coating of slurry. In testing, when pressure was applied with the basemat positioned over a firm surface, the basemat stopped moving and started to tear. Moving the coating operation to a portion of the line where the basemat was supported by a flexible belt allowed sufficient pressure to be applied to the mat to obtain a thin coating without bunching or tearing of the basemat. It is also possible to coat the basemat with no surface directly under the basemat. In this case, a screed bar or other coating device is positioned over the suspended basemat. A device for catching and recycling excess coating material is preferably positioned underneath, but not touching, the basemat.

Thicker coatings of slurry are obtainable by repeating the coating process multiple times. Preferably, two screed stations are present for application of two coatings that are substantially similar. If it is desirable to have a non-directional sheet, the cementitious slurry is applicable to both sides of the basemat.

After the slurry has been applied to the basemat, it is allowed to dry, set and harden. Any method of drying the slurry is useful, including, air drying at room temperature, oven or kiln drying or drying in a microwave oven. When allowed to dry at room temperature, a membrane is ready to use, package or store in a few hours. More preferably, the coated mat or coated paper is sent to an oven where it dries and sets rapidly. A slurry thinly applied to a basemat dries in less than 10 minutes in a 175° F. (80° C.) oven. The polymer is also curable using light, particularly light in the ultraviolet wavelength range. If the coating is made with hot polymer, curing time is decreased, but the pot life is also decreased. Exact drying times will depend on the exact composition chosen, the thickness of the slurry and the drying temperature. When the composition is set, the release paper, if present, is removed by conventional methods.

A feature of this invention is the flexible adhesive used to bond the membrane to the subfloor. It is critical that the adhesive used for bonding the membrane to the subfloor have the ability to undergo high shear deformation while still maintaining its bonding ability and functionality. An important feature of the membrane is its high tensile elongation capacity. When the subfloor cracks, propagation of cracks from the subfloor to the finish floor is substantially prevented by using an adhesive that has a high shear deformation around the crack location and tensile elongation of the membrane at and adjacent to the crack location. The preferred adhesives of the invention have a minimum tensile failure equal to 30%, preferably greater than 60%. Preferred adhesives include a single or multiple polymers. The preferred adhesives include one or more acrylic polymers that can be synthetic or natural polymers or combinations thereof.

The adhesive is applied to the substrate by any known method, including screeding, coating, spraying, spreading, rolling etc. Thickness of the adhesive upon application is preferably from about 1/32 inch to about 1/8 inch (about 0.8 mm to about 3 mm). Preferred adhesives include Mapei ECO 350 adhesive (Mapei, S.p.A, Milan, Italy). Coating weight of the adhesive is about 0.20 to 0.75 pounds per square feet (0.8 to 3.3 kg/m$^2$).

One critical feature of the adhesive is that it has a high shear deformation capacity. The adhesive must be able to absorb some of the forces that would pull the finish floor layer apart. As the shear deformation capacity of the adhesive increases, it is better able to absorb the lateral forces by deforming.

Following application of the adhesive, the membrane is installed onto the adhesive-coated substrate. The membrane is rolled out onto the adhesive and put into place. Preferably, the membrane has coating on both sides of the basemat so that either side of the membrane is usable against the adhesive. A mastic is then applied to the upper side of the membrane. After the mastic is applied, the final finish floor is applied. Slate, ceramic tile, stone, or other surface material is placed on the mastic and allowed to bond to the membrane.

If the subfloor cracks, the adhesive that is bound to the subfloor stretches to bridge the gap in the subfloor. Further shifting of the subfloor causes the membrane to elongate to accommodate the movement of the subfloor. If the lateral movement when the adhesive and the membrane are no longer stretchable, forces pulling apart the subfloor will laterally pull on the finish floor, likely causing cracking and damage. However, while the adhesive and membrane stretch, damage to the finish floor is much less likely. The crack isolation system is configurable to resist damage to the finish floor when the subfloor cracks are 1/32 inch (0.8 mm), 1/16 inch (1.6 mm) and even 1/8 inch (3.2 mm) by selection of the basemat, the amount of fly ash in the hydraulic component and the exact adhesive selected.

In the examples that follow, the crack isolating capacity of floor systems was characterized by the TCA/ANSI 118.12 system crack resistance test, herein incorporated by reference. In this test, the floor system under consideration is assembled on a test frame having a capacity to simulate a crack. Using this testing frame, a crack can be initiated and grown to simulate the effect of crack growth on the finish floor surface. Third party testing was conducted at the Tile Council of America (TCA) to characterize the crack isolation performance of the floor system of the invention and traditional rigid floor systems. Results from this study are described below.

EXAMPLE 1

Performance of Traditional Rigid Floor Systems

Three identical specimens, Specimens 1-3, were prepared by this method. DUROCK™ brand tile membrane (United States Gypsum Company, Chicago, Ill.) was bonded with Type I Organic mastic to the faces of two 10×8×2 inch concrete blocks butted and strapped together to form a 20×8×2 inch unit. A specific pattern of 4×8×1/2 inch quarry tile was laid out as described in the test method, and was bonded to the membrane with Laticrete 317 thin-set mortar mixed with Laticrete 333 additive. A 1/4×1/4 inch (6 mm×6 mm)-U notched trowel was used to apply the mortar. The system was cured for 24 hours, then grouted with Laticrete 1500 series sanded grout mixed with Laticrete 1776. The blocks were cured for an additional 28 days. After 28 days, the systems were tested on a system jig per the test method. Observations were recorded for each of the specimens as the simulated crack was widened and are reported below.

TABLE 1

| Specimen 1 | |
|---|---|
| Crack Opening | Observations |
| 0.016 inch (0.4 mm) | No cracking to grout or tile |
| 0.032 inch (0.8 mm) | Three cracked grout joints |
| 0.048 inch (1.2 mm) | No additional cracks to grout or tile |
| 0.064 inch (1.6 mm) | No additional cracks to grout or tile |
| 0.080 inch (2.0 mm) | No additional cracks to grout or tile |
| 0.096 inch (2.4 mm) | No additional cracks to grout or tile |
| 0.112 inch (2.8 mm) | No additional cracks to grout or tile |
| 0.128 inch (3.3 mm) | No additional cracks to grout or tile |

TABLE 2

| Specimen 2 | |
|---|---|
| Crack Opening | Observations |
| 0.016 inch (0.4 mm) | No cracking to grout or tile |
| 0.032 inch (0.8 mm) | No cracking to grout or tile |
| 0.048 inch (1.2 mm) | Four cracked grout joints |
| 0.064 inch (1.6 mm) | No additional cracks to grout or tile |
| 0.080 inch (2.0 mm) | No additional cracks to grout or tile |
| 0.096 inch (2.4 mm) | No additional cracks to grout or tile |
| 0.112 inch (2.8 mm) | No additional cracks to grout or tile |
| 0.128 inch (3.3 mm) | No additional cracks to grout or tile |

TABLE 3

| | |
|---|---|
| Specimen 3 | |
| Crack Opening | Observations |
| 0.016 inch (0.4 mm) | No cracking to grout or tile |
| 0.032 inch (0.8 mm) | No cracking to grout or tile |
| 0.048 inch (1.2 mm) | Three cracked grout joints |
| 0.064 inch (1.6 mm) | No additional cracks to grout or tile |
| 0.080 inch (2.0 mm) | No additional cracks to grout or tile |
| 0.096 inch (2.4 mm) | No additional cracks to grout or tile |
| 0.112 inch (2.8 mm) | No additional cracks to grout or tile |
| 0.128 inch (3.3 mm) | No additional cracks to grout or tile |

From the above samples, it is readily observed that with traditional floor construction, cracking is propagated through to the grout joints when the test crack opening is as little as 0.032 inches.

EXAMPLE 2

Performance of Floor Crack Isolation System

Three additional specimens, Specimens 4-6, were prepared using the floor crack isolation system of this invention. DUROCK brand tile membrane was bonded with a deformable adhesive, MAPEI ECO 350 Adhesive, to the faces of two 10×8×2 inch concrete blocks butted and strapped together to form a 20×8×2 inch unit. A specific pattern of 4×8×½ inch quarry tile was laid out as described in the test method, and was bonded to the membrane with Laticrete 317 thin-set mortar mixed with Laticrete 333 additive. A ¼×¼-U notched trowel was used to apply the mortar. The system was cured for 24 hours, then grouted with Laticrete 1500 series sanded grout mixed with Laticrete 1776. The blocks were cured for an additional 28 days. After 28 days, the systems were tested on a system jig per the test method. Observations were recorded for each of the specimens as the simulated crack was widened and are reported below.

TABLE 4

| | |
|---|---|
| Specimen 4 | |
| Crack Opening | Observations |
| 0.016 inch (0.4 mm) | No cracking to grout or tile |
| 0.032 inch (0.8 mm) | No cracking to grout or tile |
| 0.048 inch (1.2 mm) | No cracking to grout or tile |
| 0.064 inch (1.6 mm) | No cracking to grout or tile |
| 0.080 inch (2.0 mm) | No cracking to grout or tile |
| 0.096 inch (2.4 mm) | No cracking to grout or tile |
| 0.112 inch (2.8 mm) | No cracking to grout or tile |
| 0.128 inch (3.3 mm) | No cracking to grout or tile |

TABLE 5

| | |
|---|---|
| Specimen 5 | |
| Crack Opening | Observations |
| 0.016 inch (0.4 mm) | No cracking to grout or tile |
| 0.032 inch (0.8 mm) | No cracking to grout or tile |
| 0.048 inch (1.2 mm) | No cracking to grout or tile |
| 0.064 inch (1.6 mm) | No cracking to grout or tile |
| 0.080 inch (2.0 mm) | No cracking to grout or tile |
| 0.096 inch (2.4 mm) | No cracking to grout or tile |
| 0.112 inch (2.8 mm) | No cracking to grout or tile |
| 0.128 inch (3.3 mm) | No cracking to grout or tile |

TABLE 6

| | |
|---|---|
| Specimen 6 | |
| Crack Opening | Observations |
| 0.016 inch (0.4 mm) | No cracking to grout or tile |
| 0.032 inch (0.8 mm) | No cracking to grout or tile |
| 0.048 inch (1.2 mm) | No cracking to grout or tile |
| 0.064 inch (1.6 mm) | No cracking to grout or tile |
| 0.080 inch (2.0 mm) | No cracking to grout or tile |
| 0.096 inch (2.4 mm) | No cracking to grout or tile |
| 0.112 inch (2.8 mm) | No cracking to grout or tile |
| 0.128 inch (3.3 mm) | No cracking to grout or tile |

The above test samples clearly demonstrate the crack isolating capacity of the floor systems of the invention. Even at crack openings as large as ⅛ inch, there was no propagation of the crack, or cracking of the grout joints or ceramic tiles.

EXAMPLE 3

Durability Performance

Durability performance of the crack isolation floor system was characterized using ASTM C627 Standard Test Method for Evaluating Ceramic Tile Installation Systems Using the Robinson-Type Floor Tester. A variety of floor systems were developed and tested for characterization of floor durability performance. All floor systems used DUROCK brand tile membrane bonded to the subfloor using MAPEI Ultra/Bond ECO 350 Floor Covering Adhesive. In each case, the adhesive was applied using a ¹⁄₁₆inch×¹⁄₁₆ inch (1.6 mm×1.6 mm) U-notch trowel. The testing was conducted at the Tile Council of America (TCA), Anderson, S.C., a third party laboratory. Table 7 shows results from the TCA testing for the crack isolation floor system of this invention.

TABLE 7

| | | | |
|---|---|---|---|
| Durability Testing | | | |
| Test No. | Subfloor and Underlayment | Ceramic Tile | Rating |
| 1 | ²³⁄₃₂ inch (18.3 mm) APA Rated "Exposure 1" Plywood @ 16" OC (40 cm) frame spacing | 2 inch × 2 inch (5 cm × 5 cm) Ceramic Mosaic Tiles | Residential |
| 2 | Concrete Subfloor | 2 inch × 2 inch (5 cm × 5 cm) Ceramic Mosaic Tiles | Residential |

TABLE 7-continued

Durability Testing

| Test No. | Subfloor and Underlayment | Ceramic Tile | Rating |
|---|---|---|---|
| 3 | Concrete Subfloor | 3⅝" × 3⅝" Quarry Tiles | Light Commercial |
| 4 | 23/32 inch (18.3 mm) APA Rates "Exposure 1" Plywood @ 16 inch (40 cm) OC frame spacing + LEVELROCK Brand Floor Primer on Plywood + ¾ inch (19 mm) LEVELROCK Poured Gypsum Underlayment + LEVELROCK Brand Floor Underlayment SE-100 Sealer | 2 inch × 2 inch (5 cm × 5 cm) Ceramic Mosaic Tiles | Residential |
| 5 | Concrete Subfloor + LEVELROCK Brand Floor Underlayment TOPSEAL Primer over concrete + ¾ inch (19 mm) LEVELROCK Poured Gypsum Underlayment + LEVELROCK Brand Floor Underlayment SE-100 Sealer | 2 inch × 2 inch (5 cm × 5 cm) Ceramic Mosaic Tiles | Residential |

These results show that stable floors with good durability are obtainable with a variety of subfloors using the membrane and adhesive of this invention.

While particular embodiments of the present crack isolation floor system and method for making it has been shown and described, it will be appreciated by those skilled in the art that changes and modifications may be made thereto without departing from the invention in its broader aspects and as set forth in the following claims.

What is claimed is:

1. A floor underlayment system comprising:
    a subfloor;
    a deformable adhesive comprised of one or more acrylic polymers that can be synthetic or natural polymers or combinations thereof, wherein said deformable adhesive has a high shear deformation capacity and is bonded directly to said subfloor;
    a flexible membrane, wherein said flexible membrane is attached to said subfloor with said deformable adhesive, and wherein said flexible membrane comprises:
        a basemat; and
        a flexible coating applied to said basemat, said flexible coating comprising:
            a film-forming polymer;
            water; and
            a hydraulic component comprising at least 50% Class C fly ash by weight on a dry solids basis; and
    a finish floor consisting of at least one of ceramic, quarry tile, stone, slate and very rigid and brittle material, wherein said finish floor is attached to said flexible membrane.

2. The floor underlayment system of claim 1 wherein said hydraulic component comprises at least 80% fly ash by weight.

3. The floor underlayment system of claim 1 wherein said hydraulic component consists essentially of Class C fly ash.

4. The floor underlayment system of claim 1 wherein said film-forming polymer is a latex polymer.

5. The floor underlayment system of claim 1 wherein said basemat comprises at least one of polypropylene, polyethylene, polyvinyl alcohol, polyvinyl chloride, polyester and mixtures thereof.

6. The floor underlayment system of claim 1 wherein said deformable adhesive has a minimum tensile failure equal to 30%.

7. The underlayment system of claim 1 wherein said deformable adhesive is applied with a thickness of greater than 0 8 mm and less than 3 mm.

8. A floor underlayment system floor comprising:
    a subfloor;
    a deformable adhesive, wherein said deformable adhesive has a high shear deformation capacity and comprises single or multiple acrylic polymers, wherein said deformable adhesive is bonded directly to said subfloor;
    a flexible membrane, wherein said flexible membrane is attached to said subfloor with said deformable adhesive, and wherein said flexible membrane comprises:
        a multi-laminar basemat having at least one meltblown lamina sandwiched between two laminae; and
        a flexible coating applied to said basemat, said coating comprising:
            a hydraulic component, wherein said hydraulic component comprises Class C fly ash;
            a water soluble, film forming polymer; and
            water; and
    a finish floor consisting of at least one of ceramic, quarry tile, stone, slate and very rigid and brittle material, wherein said finish floor is attached to said flexible membrane.

9. The underlayment system of claim 8, wherein said flexible membrane comprises at least one of fiberglass, polypropylene, polyethylene, polyester, polyvinyl alcohol or combinations thereof.

10. The underlayment system of claim 8 wherein said deformable adhesive is applied with a thickness of greater than 0 8 mm and less than 3 mm.

* * * * *